United States Patent Office.

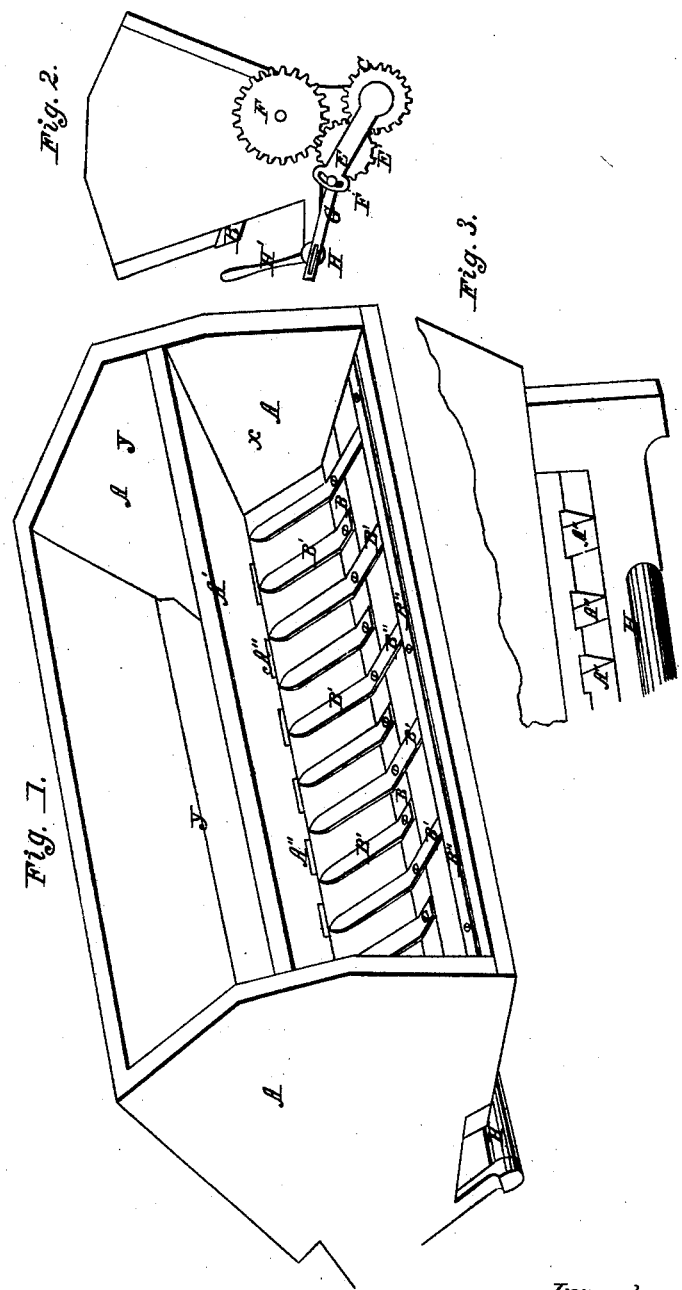

HIRAM L. BROWN AND CALVIN P. BROWN, OF MANCHESTER, NEW YORK.

Letters Patent No. 90,493, dated May 25, 1869.

---

IMPROVEMENT IN MACHINE FOR DISTRIBUTING GUANO.

---

The Schedule referred to in these Letters Patent and making part of the same.

---

*To all whom it may concern:*

Be it known that we, HIRAM L. BROWN and CALVIN P. BROWN, of Manchester, in the county of Ontario, and State of New York, have invented a new and useful Improvement in Machines for Sowing Guano, Bone-Dust, &c.; and we do hereby declare that the following is a full, clear, and exact description of the same, reference being had to the annexed drawings, in which—

Figure 1 is a perspective view, showing the inside of the hopper;

Figure 2 is an end elevation; and

Figure 3 is another perspective view of the hopper.

The same letters in all the figures indicate the same parts.

Our invention relates to a machine for sowing guano, bone-dust, and other fertilizers, which may be attached to a grain-drill by changing the hopper; and It consists in a novel construction of the hopper, and combining therewith an agitator of peculiar construction, operated by mechanism to be described.

A is the hopper, divided by the partition $A^1$, which forms a receptacle on one side for the fertilizer.

In the bottom of the partition is a series of openings, $A^2$, narrow where they open out of the compartment $x$, and funnel-formed toward the side of the partition $y$, so as not to interfere with the easy passage of the fertilizer through said orifices, whence it falls upon the ground, the hopper being open at the bottom, on the side Y.

The fertilizer is moved by flat pointed fingers $B^1$, attached to a reciprocating bar, B, said fingers lying upon the side and bottom of the hopper, as shown.

Some of these fingers are extended above the bar B, having the upper points protected by the guard-plate $B^2$.

The agitator is moved by the spur-wheel C, attached to the revolving axle of the machine, which drives the intermediate spur-wheel E', and the spur F, which is connected with the bar B by ordinary mechanism, such as is used in drills to give a reciprocating motion to the agitators therein used.

The spur-wheel E' is attached by a wrist on the arm E, which turns upon the axle so that the intermediate spur-wheel may be thrown into and out of gear when desired. This is effected by means of a connecting-rod, G, attached to the arm E, and having a wrist projecting through a curved slot in the end of said arm.

This connecting-rod is attached to a pin projecting from the periphery of a shaft, H, running across the machine, and turning in bearings attached to the ends of the hopper.

H' is a lever for turning this shaft, when it is desired to throw the intermediate wheel into or out of gear.

What we claim as our invention, and desire to secure by Letters Patent, is—

1. In combination with a hopper, A, having at the bottom orifices $A^1$, the fingers $B^1$, and bar B, arranged in relation to the hopper, substantially as and for the purpose set forth.

2. The jointed lever, constructed substantially as shown and described.

In testimony whereof, we have signed our names to this specification, in the presence of two subscribing witnesses.

HIRAM L. BROWN.
CALVIN P. BROWN.

Witnesses:
GEO. N. WILLIAMS,
I. R. PARCELL.